United States Patent

[11] 3,628,037

[72] Inventors Mititaka Yamamoto; Kenichi Kitajima, both of Kyoto, Japan
[21] Appl. No. 842,235
[22] Filed July 16, 1969
[45] Patented Dec. 14, 1971
[73] Assignee Omron Tateisi Electronics Co. Kyoto, Japan
[32] Priority July 26, 1968
[33] Japan
[31] 43/53273

[54] PHOTOELECTRIC SWITCH UNIT
6 Claims, 3 Drawing Figs.

[52] U.S. Cl. 250/229, 250/237, 317/124
[51] Int. Cl. G01d 5/34, H01j 1/56
[50] Field of Search 250/229, 220, 219, 237; 317/124; 84/1.18

[56] References Cited

UNITED STATES PATENTS

| | | | |
|---|---|---|---|
| 2,641,753 | 6/1953 | Oliwa | 250/220 X |
| 3,011,379 | 12/1961 | Corwin | 84/1.18 X |
| 3,235,741 | 2/1966 | Plaisance | 250/229 |
| 3,336,482 | 8/1967 | Mierendorf et al. | 250/239 |
| 3,336,588 | 8/1967 | Bajorat et al. | 250/208 X |
| 3,513,247 | 5/1970 | Anderson et al. | 84/1.18 |

*Primary Examiner*—D. F. Duggan
*Assistant Examiner*—Ulysses Weldon
*Attorney*—Christensen and Sanborn

ABSTRACT: A photoelectric switch unit comprising a single source of light, a plurality of photoelectric elements each so arranged as to receive light from the light source and a plurality of shutters each interposed between the light source and one of the photoelectric elements to normally block the light, each of the shutters being so arranged as to be selectively movable individually and independently of the other shutters from the path of the light to permit the light to enter and actuate the corresponding one of the photoelectric elements. The single source of light, each of the photoelectric elements and each of the shutters are associated to form one photoelectric switch, and there are a plurality of such switches included in the switch unit, the operation of each of which is performed individually and independently of the other switches in the unit.

INVENTORS
Mititako Yamamoto
BY Kenichi Kitajima
Christensen, Sanborn & Matthews ATTORNEY

PHOTOELECTRIC SWITCH UNIT

This invention relates to a photoelectric switch unit which comprises a single source of light and a plurality of photoelectric elements so arranged that the switching action of the elements is performed by opening and closing the path of the light beams projected by the source of light onto the photoelectric elements.

A photoelectric switch generally comprises a source of light, a photoelectric element such as a *cds* element, i.e., a cadmium sulfide element whose electrical resistance varies upon impingement of light thereon or a phototransistor whose electromotive force varies upon impingement of light thereon, and a shutter blade. The shutter blade is disposed between the source of light and the photoelectric element in such a manner that it may selectively be placed in the path of the light beam from the source to prevent the beam from entering the photoelectric element and removed from the light path to permit the light beam to hit on the photoelectric element, thereby effecting the switching action of the switch.

Known photoelectric switches, however, comprises a single lamp, a single photoelectric element and a single shutter blade. If a plurality of photoelectric switches are required, a plurality of lamps, photoelectric elements and shutters must be provided, and to have these switches assembled as a single unit, various members and parts are also required to assemble the switches, with resulting increase in the size of the assembled unit.

The primary object of the invention is therefore to provide a photoelectric switch unit including a plurality of photoelectric switches, which is simple in construction and compact in size. Another object of the invention is to provide a photoelectric switch unit in which a single lamp is in common use with a plurality of photoelectric elements to provide a plurality of photoelectric switches.

In accordance with the invention, each of the photoelectric switches included in the switch unit has a shutter interposed between the photoelectric element and the single lamp in such a manner that the shutter may selectively be moved in and out of the path of the light from the lamp to the photoelectric element. The single lamp is enclosed in a cover having as many windows in the sidewalls thereof as there are photoelectric elements. Each of the photoelectric elements is also enclosed in a casing having a window arranged to face one of the windows of the lamp cover so that the light coming out of the windows of the lamp cover impinges upon the photoelectric elements through the windows of their respective casings. The movable shutter is interposed between each of the windows of the lamp cover and the window of each of the casings of the photoelectric elements.

The invention will be more clearly understood by reading the following description of a preferred embodiment thereof with reference to the accompanying drawings, wherein.

Figure 1:
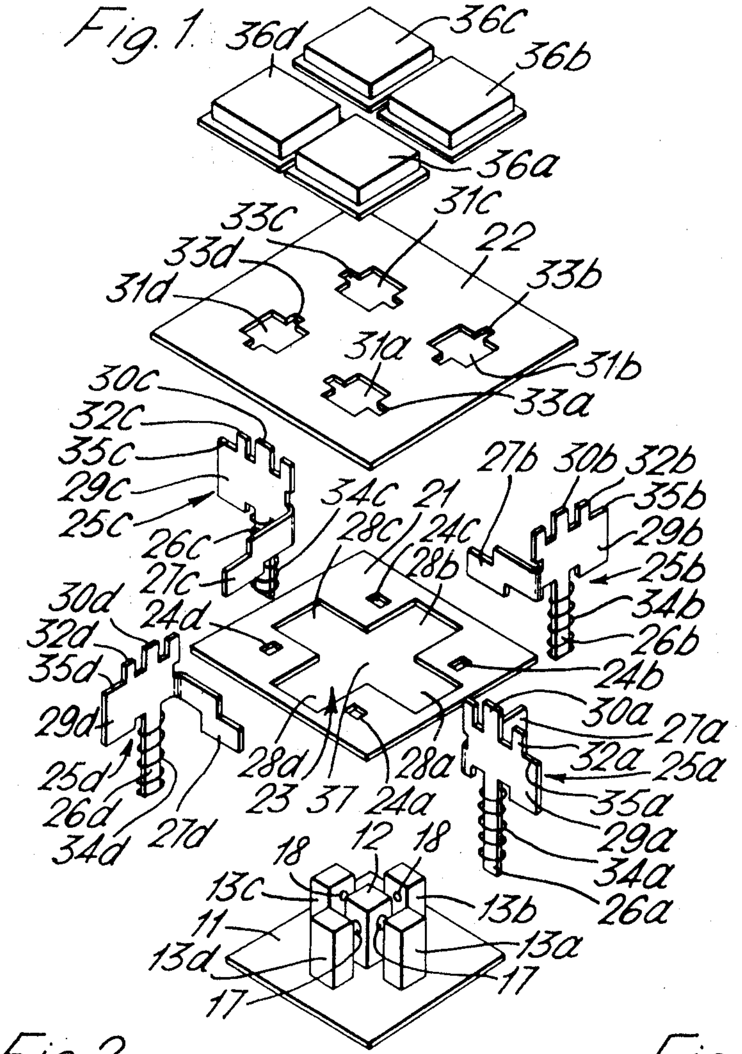
FIG. 1 is an exploded perspective view of a photoelectric switch unit embodying the invention.

Referring now in detail to the drawings, there is shown a baseplate 11 carrying thereon a lamp cover 12 enclosing a lamp, not shown, and four casings 13*a*, 13*b*, 13*c* and 13*d* enclosing a photoelectric element, not shown, and arranged at the four sides of the lamp cover. In the drawings, no connecting wires are shown for simplicity of illustration. The lamp cover 12 is provided with a window 17 in each of the four sidewalls thereof, through which the lamp inside the cover 12 projects light outwardly. The casings 13*a*–13*d* of the photoelectric elements also have a window 18 facing one of the windows 17 of the lamp cover 12, so that the light coming out through the window 17 enters the window 18 to impinge upon the photoelectric element therein.

Above the baseplate 11 there are arranged a pair of guide plates 21 and 22 vertically spaced from the baseplate 11 and from each other. The lower guide plate 21 is formed with a large cruciform opening 23 and four relatively small guide slots 24*a*,24*b*,24*c* and 24*d*. Four shutters 25*a*,25*b*,25*c* and 25*d*,which are of the same shape and construction, comprise a body portion 29*a*–29*d*,a shutter blade 27*a*–27*d*, and a leg 26*a*–26*bx*depending from the lower edge of the body portion. The shutters are L-shaped as viewed from above and may be punched out from a sheet of metal and bent into the required shape.

Figure 2:
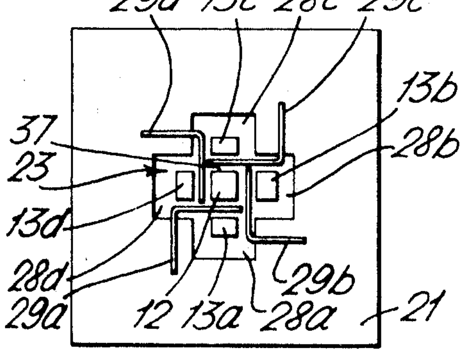
FIG. 2 is a top plan view of the switch unit of FIG. 1 assembled, but without the pushbuttons and the upper guide plate to show the relative positions of the shutters, the lamp cover and the casings of the photoelectric elements.

When the legs 26*a*–*d* are inserted into their respective guide slots 24*a*–24*d* in the lower guide plate 21, the shutter blades 27*a*–27*d* close the four notches 28*a*–28*d* of the cruciform opening 23 of the plate 21 as shown in FIG. 2. The body portion 29*a*–29*d* of each shutter is provided at its upper edge with an upstanding central tongue 30*a*–30*d*and a pair of upstanding tongues 32*a*–32*d* at the opposite sides of the central tongue. The upper guide plate 22 is formed with four square guide openings 31*a*–31*d* each having a pair of notches 33*a*–33*d* at the opposite edges thereof. The central tongue of each shutter having its leg inserted into the guide slot in the lower plate 21 projects upwardly through the corresponding one of the guide openings 31*a*–31*d* in the upper plate 22, with the side tongues simultaneously projecting upwardly through the opposite notches 33*a*–33 of that guide opening. It will be seen that these openings 31*a*–31*d* with their notches 33*a*–33*d* guide the respective shutters when the latter are moved up and down in the manner to be presently described.

Figure 3:
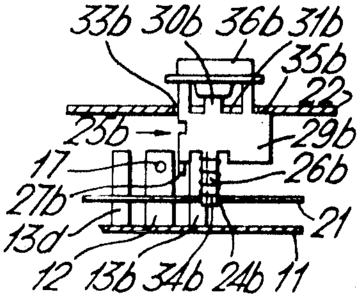
FIG. 3 is a side view, partly in section, of a portion of FIG. 2.

Each shutter is formed with a shoulder 35*a*–35*d*, and a coil spring 34*a*–34*d* entangles the leg 26*a*–26*d* of each shutter so as to normally bias the shutter upwardly as far as the shoulder of that shutter abuts on the under surface of the upper plate 22 as shown in FIG. 3.

Four pushbuttons 36*a*–36*d* are mounted on the upper plate 22 so that the undersides of the pushbuttons are engaged by the central tongues 30*a*–30*d* of the shutters projecting upwardly through the guide openings 31*a*–31*d* of the upper guide plate 22, respectively. When the push buttons are depressed, the shutters are moved downward against the resiliency of the coil springs 34*a*–34*d*; and when the pressure on the push buttons are released, the coil springs restores the shutters upward to their original position.

The lower guide plate 21 is so spaced from the baseplate 11 that the four casings 13*a*–13*d* of the photoelectric elements on the base plate 11 are positioned in the notches 28*a*–28*d*, respectively, of the opening 23 in the lower guide plate 21, with the lamp cover 12 being positioned in the central portion 37 of the opening 23, and that the shutter blades 27*a*–27*d* are interposed just between the windows 17 of the lamp cover 12 and the opposed windows 18 of the casings 13*a*–13*d*, thereby preventing the light from the lamp in the cover 12 from hitting the photoelectric elements in the casings 13*a*–13*d*.

When one of the pushbuttons, say, 36*b* has been depressed, the shutter 25*b* is pushed down against the resiliency of the coil spring 34*b*, with the shutter blade 27*b* being simultaneously moved downwardly from the position between the windows 17 and 18, so that the light coming out through the window 17 of the lamp cover can now enter the opposed window 18 of the casing 13*b* to impinge upon the photoelectric element therein.

Thus, in accordance with the invention, the movement of each shutter is entirely independent of the movement of the other shutters, so that the operation of each photoelectric switch has no effect on the other switches. Since the single lamp is used in common with the plurality of photoelectric elements, the switch unit is much more simplified in construction and reduced in size than the prior art switches of the type.

While one preferred embodiment of the invention has been illustrated and described, it should be recognized that there are many modifications and changes thereof which will occur to those skilled in the art. For example, the lamp cover may have a plurality of windows vertically arranged one above another in one and the same sidewall of the lamp cover. In this case, the casings of the photoelectric elements must also be arranged vertically one above another with their windows facing the windows on the lamp cover, and each of the shutter blades must be interposed between each opposed pair of the windows in such a manner as not to get in the paths of the light beams other than the path of that light beam which each shutter blade should intercept.

We claim:

1. In combination, a shutter assembly for operating a photoelectric switch unit comprising means defining a pair of relatively superposed upper and lower mounting members which are spaced apart in the vertical direction and equipped with a plurality of apertures including a central aperture in the relatively lower member and a plurality of mounting apertures in the relatively upper member which are arranged in angularly spaced offset relationship about the central aperture in the relatively lower member, and a plurality of shutter members interposed in the space between the mounting members, about the central aperture in the lower member, the bodies of which are individually vertically reciprocably guided in the mounting apertures and yieldably upwardly biased into stopped positions abutting the underside of the upper member, for pushbutton operation against the bias thereon from above the upper mounting member, and which moreover, are equipped with vertically oriented shutter blades that occupy a common horizontal plane in the stopped positions of the shutter members, and extend in angular relationship to one another, relatively laterally inwardly from the bodies of the shutter members, opposite the central aperture in the lower member; and a photoelectric switch unit which is detachably associated with the shutter assembly, comprising a base which is positioned relatively below the lower mounting member and has a light source fixedly mounted at a raised level thereon, and a plurality of photoelectric switches also fixedly mounted thereon, the photoelectric elements of which are individually surrounded by an equal number of open-sided casings which are upstanding on the base, in angularly spaced relationship to one another about the light source, with the side openings thereof in a common horizontal plane coincident with the light source and the elements, and which together with the light source, are removably inserted upright through the central aperture in the lower mounting member, and disposed in the space between the mounting members, at a level and orientation in which the planes of the shutter blades and the side openings of the casings coincide with one another, and the blades are interposed in the spaces between the casings, and in the stopped positions of the shutter members, register with the openings of the casings to deenergize the switches.

2. The combination according to claim 1 wherein the light source is enclosed in a surrounding cover which is upstanding on the base in the space between the mounting members, and which has angularly spaced windows in the sides thereof coincident with the plane of the light source and the elements.

3. The combination according to claim 2 wherein the central aperture in the lower mounting member has a series of notches in the rim thereof, and the casings of the elements are disposed in the notches with the light cover centered inside the arrangement thereof within the aperture itself.

4. The combination according to claim 1 wherein the bodies of the shutter members and the blades thereon are joined in an L-shaped configuration in plan view.

5. The combination according to claim 4 wherein the shutter blades are disposed at right angles to one another.

6. The combination according to claim 1 wherein the bodies of the shutter members have legs thereon which are slidably guided in a set of other apertures in the lower mounting member, that are disposed about the central aperture therein, there being coiled springs caged between the bodies of the shutter members and the lower mounting member, about the legs, to bias the shutter members into the stopped positions thereof.

* * * * *

PO-1050
(5/69)

UNITED STATES PATENT OFFICE
CERTIFICATE OF CORRECTION

Patent No. 3,628,037 Dated December 14, 1971

Inventor(s) Mititaka Yamamoto and Kenichi Kitajima

It is certified that error appears in the above-identified patent and that said Letters Patent are hereby corrected as shown below:

In the Specification:

Col. 2, line 6, cancel 26a-26bq and insert therefor

--26a-26d--;

Col. 2, line 25, cancel 33-a-33 and insert therefor

--33a-33d--.

Signed and sealed this 6th day of June 1972.

(SEAL)
Attest:

EDWARD M.FLETCHER, JR.
Attesting Officer

ROBERT GOTTSCHALK
Commissioner of Patents